United States Patent [19]

Burns et al.

[11] Patent Number: 4,694,038

[45] Date of Patent: Sep. 15, 1987

[54] LOW FRICTION, LOW WEAR COATING AND PAINT FOR RUBBER

[75] Inventors: Robert A. Burns, Seattle; Jan W. VanWyk, Kirkland, both of Wash.

[73] Assignee: The Boeing Company, Seattle, Wash.

[21] Appl. No.: 920,628

[22] Filed: Oct. 20, 1986

[51] Int. Cl.⁴ .......................... C08K 7/00; C08K 3/04
[52] U.S. Cl. ..................................... 524/590; 524/495
[58] Field of Search ................ 524/590, 495, 496, 847

[56] References Cited

U.S. PATENT DOCUMENTS

| | | | |
|---|---|---|---|
| 3,399,103 | 8/1968 | Salyer et al. ......................... | 524/496 |
| 4,237,176 | 12/1980 | Brueggemann et al. ........... | 525/221 |

FOREIGN PATENT DOCUMENTS

| | | | |
|---|---|---|---|
| 60-118744 | 6/1985 | Japan .................................... | 524/496 |
| 1229456 | 4/1971 | United Kingdom ................ | 524/495 |

Primary Examiner—Lewis T. Jacobs
Attorney, Agent, or Firm—John C. Hammar

[57] ABSTRACT

A low friction, low wear coating paint for rubber comprises polyurethane enamel filled with between about 20–40 wt. % amorphous flake graphite.

5 Claims, No Drawings

LOW FRICTION, LOW WEAR COATING AND PAINT FOR RUBBER

The United States Government has rights in this invention pursuant to Air Force Contract No. F04704-83-C-0048.

TECHNICAL FIELD

The present invention relates to a graphite-filled polyurethane enamel that provides a low friction, low wear coating for rubber.

BACKGROUND ART

The coefficient of dynamic friction between rubber and epoxy-painted structural steel members is typically about 0.15 at about 400 psi and a speed of about 4 ft/sec, and is a problem in many circumstances, since destructive wear of the rubber will quickly occur during use.

While many greaseless lubricants are known, such as nylon, solid powders, Teflon, molybdenum disulfide, or graphite a solution to the rubber wear and friction problems in missile silo egress seals requires the optimum slipperiness (or friction reduction) coupled with long life.

SUMMRY OF THE PRESENT INVENTION

The low friction, low wear coating of the present invention is a graphite-filled polyurethane enamel including about 20-40 wt. % flake graphite. Laboratory tests have shown that this paint provides a coating on rubber that has the best adhesion, longest wear, and low friction. Preferably the paint includes between about 25-35 wt. % amorphous graphite (grade #402-A Superflake ND.2 available from Superior Graphite Co.) in a superdesothane, flexible polyurethane enamel with curing solution (available from Desoto and categorized as BMS 10-60F Type II flexible polyurethane enamel).

BEST MODE CONTEMPLATED FOR MAKING AND USING THE INVENTION

Slippage of the epoxy-painted mild steel wall of the missile sleeve over the Peacekeeper egress rubber seal severely tests the wear resistance of the seal. Boeing tests have shown that the coefficient of dynamic friction for the uncoated rubber seal in this circumstance is about 0.15. The friction can be greatly reduced and the life of the seal can be greatly increased by coating the rubber seal with an enamel coating comprising 20-40 wt. % flake graphite in polyurethane. Preferably about 25-35 wt. % graphite is used, and the best results have been achieved with 35 wt. %. The results with graphite alone are better than with molybdenum disulfide, Teflon, or combinations of any three of the lubricants. Flake graphite (particularly amorphous graphite grade #402-A Superflake ND.2) performed better than fine graphite powder.

Without graphite tests have shown the coatings soon wear through so that bare rubber is exposed thereby dramatically increasing the friction and damaging the seal.

The preferred polyurethane enamel is a Desoto desothane flexible polyurethane enamel that includes curing solution, and is designated as Boeing BMS 10-60F, Type II, Class A enamel. This paint vehicle is a high quality paint for many surfaces (including metal, concrete, wood, or plastic), has high pressure tolerance (up to about 3000 psi), and can be used over a temperature range from about −75 to 400° F. This enamel is fast drying from the aerosol (or airless spray). Other polyurethane paints, like those described in U.S. Pat. No. 3,012,984, might be used.

A urethane enamel of this general type was required to achieve good adhesion of the slip coating to the rubber. Teflon-based paints would not stick. Adhesion was improved by pretreating the clean rubber with 240 grit sandpaper or a wire brush.

Flake graphite of medium grit is believed to be required to obtain the optimal reduction in the friction. Finely powdered graphite did not work as well.

Below about 20 wt. % graphite, the desired reduction in friction was lost. Above about 40 wt. % graphite, the desired adhesion was lost. Optimal performance was achieved at about 35 wt. % graphite. Other additives either alone or in combination with graphite did not perform as well in bench scale tests.

The performance (i.e., reduction in friction achievable by the invention) is best understood, perhaps, by reference to the following table:

TABLE I

| | % Lubricant in Enamel | Dynamic Friction 1 sec. | 5 sec. |
|---|---|---|---|
| 1. | 20% graphite | 0.18 | 0.50 |
| 2. | 20% graphite | 0.375 | 0.90 |
| 3. | 30% graphite | 0.083 | 0.083 |
| 4. | 30% graphite | 0.12 | 0.15 |
| 5. | 35% graphite | 0.06 | |
| 6. | 40% graphite | 0.062 | 0.062 |
| 7. | 40% graphite | 0.062 | 0.062 |
| 8. | 40% $MoS_2$ | 0.81 | 0.81 |
| 9. | 60% $MoS_2$ | 0.21 | 0.20 |
| 10. | 40% Teflon | 0.30 | 0.55 |
| 11. | 30% $MoS_2$:10% graphite: 10% Teflon | 0.20 | 0.25 |
| 12. | 25% $MoS_2$:20% graphite | 0.25 | 0.25 |
| 13. | No lubricant | 0.30 | |

**Rubber coated with MS-122 Teflon.

All tests were conducted at 400 psi and 4 ft/sec. against BMS-150 rubber by revolving a 10 inch diameter mild steel disk at 239 rpm to achieve the desired speed at a 4 in. radius. The $MoS_2$ was Molykote Dry Lubricant powder per MIL-M-7866A and was manufactured by Alpha-Molykote Corporation. The Teflon was Fluorocomp A filled PTFE fluoropolymer compound manufactured by LND Corpora- tion. The graphite was Grade #402-A superflake ND.2 manufactured by Superior Graphite Company.

While preferred embodiments have been described, those skilled in the art will readily recognize variations, alterations, or modifications that might be made in the described embodiments or specific examples without departing from the inventive concept. Accordingly, the description should be construed and interpreted broadly to protect the invention, and the claims should be interpreted liberally. The claims should not be limited to the preferred embodiments unless such limitations are necessary in view of the pertinent prior art.

We claim:

1. An enamel consisting essentially of polyurethane enamel paint filled with between about 20-40 wt. % amorphous flake graphite.

2. The paint of claim 1 wherein the graphite comprises about 30-40 wt. %.

3. The paint of claim 1 wherein the enamel has pressure tolerance up to about 3000 psi and a use temperature in the range of between about −75° to 400° F.

4. The paint of claim 1 wherein the graphite comprises about 35-40 wt. %.

5. A coating for rubber comprising the cured paint of claim 1.

* * * * *